(12) United States Patent
Sakurai (10) Patent No.: US 12,159,975 B2
(45) Date of Patent: Dec. 3, 2024

(54) POWER STORAGE ELEMENT

(71) Applicant: TOYOTA JIDOSHA KABUSHIKI KAISHA, Toyota (JP)

(72) Inventor: Takahiro Sakurai, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 16/884,237

(22) Filed: May 27, 2020

(65) Prior Publication Data

US 2020/0403275 A1   Dec. 24, 2020

(30) Foreign Application Priority Data

Jun. 19, 2019   (JP) .................................. 2019-113980

(51) Int. Cl.
*H01M 10/0587* (2010.01)
*H01M 10/04* (2006.01)
(Continued)

(52) U.S. Cl.
CPC .... *H01M 10/0587* (2013.01); *H01M 10/0431* (2013.01); *H01M 50/474* (2021.01);
(Continued)

(58) Field of Classification Search
CPC ......... H01M 10/0431; H01M 10/0587; H01M 50/474; H01M 50/486; Y02E 60/10; Y02P 70/50
(Continued)

(56) References Cited

U.S. PATENT DOCUMENTS

2008/0280197 A1* 11/2008 Machida ........... H01M 10/0565
429/129
2012/0058375 A1* 3/2012 Tanaka .................. H01M 4/664
977/773
(Continued)

FOREIGN PATENT DOCUMENTS

| CN | 101304103 A | 11/2008 |
|----|-------------|---------|
| JP | 62-088369 U | 6/1987 |

(Continued)

OTHER PUBLICATIONS

Partial Translation of Office Action Issued to JP2019-113980 on Mar. 28, 2023.

*Primary Examiner* — Jonathan G Jelsma
*Assistant Examiner* — Omar M Kekia
(74) *Attorney, Agent, or Firm* — Dickinson Wright, PLLC (57) ABSTRACT

A protruding portion of a current collecting foil is provided at one end in a width direction over an entire length in a longitudinal direction. A first end of a positive electrode plate, which is located on a side on which the protruding portion is provided, is located outward of a second end in the width direction, the second end being an end of a positive electrode active material layer in the width direction located adjacent to the protruding portion. An insulating tape is interposed between a positive electrode plate and the negative electrode plate. Regarding a size and a position of the insulating tape, the insulating tape is provided in a region including the second end and the first end in the width direction, and the insulating tape is provided in a region including longitudinal ends of the positive electrode plate in the longitudinal direction.

12 Claims, 10 Drawing Sheets

(51) Int. Cl.
*H01M 50/474* (2021.01)
*H01M 50/486* (2021.01)

(52) U.S. Cl.
CPC ............ *H01M 50/486* (2021.01); *Y02E 60/10* (2013.01); *Y02P 70/50* (2015.11)

(58) Field of Classification Search
USPC ........................................................ 429/225
See application file for complete search history.

(56) References Cited

U.S. PATENT DOCUMENTS

| | | | |
|---|---|---|---|
| 2016/0380257 A1* | 12/2016 | Saruwatari | ............ H01M 50/46 429/62 |
| 2018/0097218 A1 | 4/2018 | Komura | |
| 2019/0140238 A1* | 5/2019 | Hiramoto | ............ H01M 50/461 |
| 2020/0168886 A1* | 5/2020 | Sato | ................... H01M 10/0566 |

FOREIGN PATENT DOCUMENTS

| | | | | |
|---|---|---|---|---|
| JP | 03-069860 U | 7/1991 | | |
| JP | 2000173657 A | 6/2000 | | |
| JP | 2004241170 A | 8/2004 | | |
| JP | 2006019199 A | 1/2006 | | |
| JP | 2016115575 A | 6/2016 | | |
| JP | 2016119183 A | 6/2016 | | |
| JP | 2018060631 A | 4/2018 | | |
| KR | 20090104642 A | 10/2009 | | |
| WO | WO2019049479 | * | 3/2019 | ........ H01M 10/0525 |

* cited by examiner

POWER STORAGE ELEMENT

INCORPORATION BY REFERENCE

The disclosure of Japanese Patent Application No. 2019-113980 filed on Jun. 19, 2019 including the specification, drawings and abstract is incorporated herein by reference in its entirety.

BACKGROUND

1. Technical Field

The disclosure relates to a power storage element having an electrode winding body formed by winding belt-shaped positive and negative electrode plates. More specifically, the disclosure relates to a power storage element that uses a separator-integrated electrode plate in which a separator is integrated with one of the electrode plates to restrain a short circuit between the electrode plates.

2. Description of Related Art

Examples of the power storage element that uses a separator-integrated electrode plate include those described in Japanese Unexamined Patent Application Publication No. 2018-060631 (JP 2018-060631 A). In a battery described in JP 2018-060631 A, the separator-integrated electrode plate is used as the negative electrode plate of the positive and negative electrode plates. The separator-integrated electrode plate described in JP 2018-060631 A has a current collecting plate and an active material layer provided on the current collecting plate, and a separator layer provided on the active material layer. The separator layer is formed by depositing resin particles. The technique described in JP 2018-060631 A combines a polyimide layer with the separator layer of the resin particles, thereby improving the resistance against penetration by foreign matters.

SUMMARY

However, the technique described in JP 2018-060631 A described above has the following problems. A short circuit between the positive and negative electrode plates in the electrode body is more likely to occur than in the case of a battery using a film separator. The reason is that, unlike the case of the film separator, it is difficult to form a separator larger than the electrode plates with the separator-integrated electrode plate in size. Thus, the positive and negative electrode plates are disposed in close vicinity to each other at ends of the electrode plates with no shield therebetween. This tendency is particularly strong at longitudinal ends of the electrode plates when the electrode body is of a wound type. This is because the longitudinal ends include both ends in a longitudinal direction and ends in a width direction.

The disclosure provides a power storage element that uses a separator-integrated electrode plate and suppresses a short circuit between the positive and negative electrode plates in an electrode winding body, particularly at longitudinal ends of the electrode plate.

An aspect of the disclosure relates to a power storage element including an electrode winding body provided by winding a first electrode plate and a second electrode plate, such that each of the first electrode plate and the second electrode plate has a belt shape having a size in a longitudinal direction longer than a size in a width direction. The first electrode plate includes a first current collecting foil, a first electrode active material layer disposed on a surface of the first current collecting foil, and a separator layer that covers the first electrode active material layer. The second electrode plate includes a second current collecting foil and a second electrode active material layer disposed on a surface of the second current collecting foil. A protruding portion in which the second current collecting foil is not covered with the second electrode active material layer is provided at one end in the width direction over an entire length in the longitudinal direction. In the electrode winding body, of ends of the first current collecting foil, the first electrode active material layer, and the separator layer in the width direction, a first end located on a side on which the protruding portion is provided is located outward of a second end in the width direction. The second end is an end of the second electrode active material layer in the width direction located adjacent to the protruding portion. In the electrode winding body, an insulating member is interposed between the first electrode plate and the second electrode plate. The insulating member is provided in a region including at least the second end and the first end in the width direction. The insulating member is provided in a region including a third end of the second electrode plate in the longitudinal direction and a fourth end opposite to the third end in the longitudinal direction, and is not provided in a region between the third end and the fourth end in the longitudinal direction.

In the electrode winding body of the power storage element according to the above aspect, direct contact between the first electrode active material layer and the second electrode active material layer is restrained by the separator layer provided integrally with the first electrode plate. The integral-type separator layer is not provided so as to protrude outward from the first electrode plate. In the power storage element according to the above aspect, the insulating member is provided at positions of the third end and the fourth end of the second electrode plate so as to be interposed between the first electrode plate and the second electrode plate. Since the insulating member is provided in a region including the second end and the first end in the width direction, a short circuit between the first electrode plate and the second electrode plate is suppressed. Since the insulating member is not provided in the region between the third end and the fourth end, the power generation performance of the electrode winding body is not restrained. In the electrode winding body, the end of the first electrode plate may be located outside the end of the second electrode plate in the longitudinal direction on both a winding start side and a winding end side.

In the power storage element according to the above aspect, the second electrode plate may have an insulating layer that covers a region of the protruding portion, such that the region is adjacent to the second electrode active material layer. The first end may be located within a range where the insulating layer is provided. The insulating member may be provided in a region including at least a region where the insulating layer is provided in the width direction. With this configuration, in the region between the third end portion and the fourth end portion, the short circuit is suppressed between the first end portion of the first electrode plate and the protruding portion of the second electrode plate by the insulating layer.

In the power storage element according to the above aspect, the insulating member may be provided over an entire length of the second electrode plate in the width direction. With this configuration, the thickness of the electrode winding body does not become uneven in the width direction due to the insulating member.

In the power storage element according to the above aspect, the electrode winding body may be a flat winding body having a flat portion and two turning portions, and at least one of the insulating members may be disposed on an upper turning portion of the two turning portions in a use state of the power storage element. In the electrode winding body, there is a gap adjacent to an end of the second electrode plate on the winding end side (the third end or the fourth end). In the above aspect, the gap is large because the insulating member is interposed between the two electrode plates. This gap can function as an electrolyte solution reservoir. When the electrode winding body is of a flat type, according to the above aspect, liquid retainability at the upper part of the electrode winding body can be improved.

In the power storage element according to the above aspect, the insulating member may be a resin tape, such that one surface of the insulating member is an adhesive surface. The insulating member may be provided on front and back surfaces of the second electrode plate at the third end and the fourth end, with the adhesive surface facing the second electrode plate and a part of the insulating member disposed so as to protrude outward from the second electrode plate in the longitudinal direction. With this configuration, the position of the insulating member is stabilized before the winding, which facilitates the operation of winding the first electrode plate and the second electrode plate into an electrode winding body.

According to this configuration, there is provided a power storage element that uses a separator-integrated electrode plate and suppresses a short circuit between positive and negative electrode plates in an electrode winding body, particularly at a third end and a fourth end of the electrode plate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment implementing a power storage device of the disclosure will be described in detail with reference to the accompanying drawings. In the embodiment, the disclosure is applied to a battery 1 shown in FIG. 1. The battery 1 shown in FIG. 1 has a flat rectangular battery case 10 in which an electrode winding body 20 is housed. The electrode winding body 20 has a power generating portion 41 disposed at the center of the electrode winding body 20, and a positive electrode connecting portion 21 disposed on one side of the power generating portion 41 and a negative electrode connecting portion 31 disposed on the other side thereof. The battery case 10 stores an electrolyte solution 19 in addition to the electrode winding body 20. A part of the stored electrolyte solution 19 is impregnated in the electrode winding body 20. A positive electrode terminal 51 and a negative electrode terminal 61 are provided on a lid portion 13 of the battery case 10. Inside the battery case 10, the positive electrode terminal 51 and the positive electrode connecting portion 21 are connected by a positive electrode current collecting member 50, and the negative electrode terminal 61 and the negative electrode connecting portion 31 are connected by a negative electrode current collecting member 60.

Figure 2:
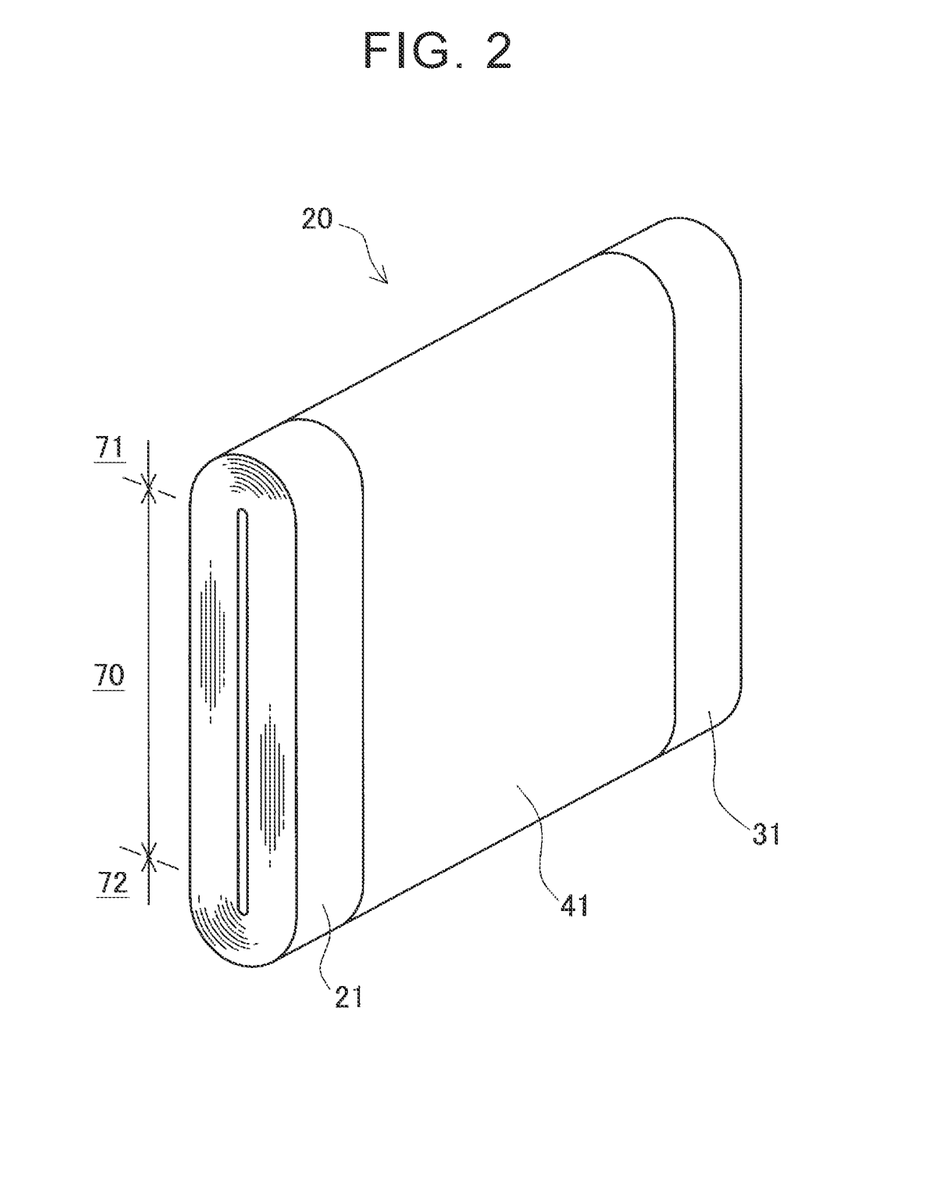
FIG. 2 is a perspective view of an electrode body built in the battery according to the embodiment.

FIG. 2 shows a single unit of the electrode winding body 20. The electrode winding body 20 is formed by winding a positive electrode plate and a negative electrode plate as described later. The power generating portion 41 is a region where both the positive electrode plate and the negative electrode plate are provided, the positive electrode connecting portion 21 is a region where only the positive electrode plate is provided, and the negative electrode connecting portion 31 is a region where only the negative electrode plate is provided. The overall shape of the electrode winding body 20 is a flat shape conforming to the square shape of the battery case 10. The electrode winding body 20 has a flat portion 70 at the center thereof in the vertical direction and upper and lower turning portions 71 and 72 such that the flat portion 70 is interposed between the upper and lower turning portions 71 and 72. The turning portions 71 and 72 are portions where the positive electrode plate and the negative electrode plate are folded. The flat portion 70 is a part where the positive electrode plate and the negative electrode plate are flat between the turning portions 71 and 72.

Figure 3:
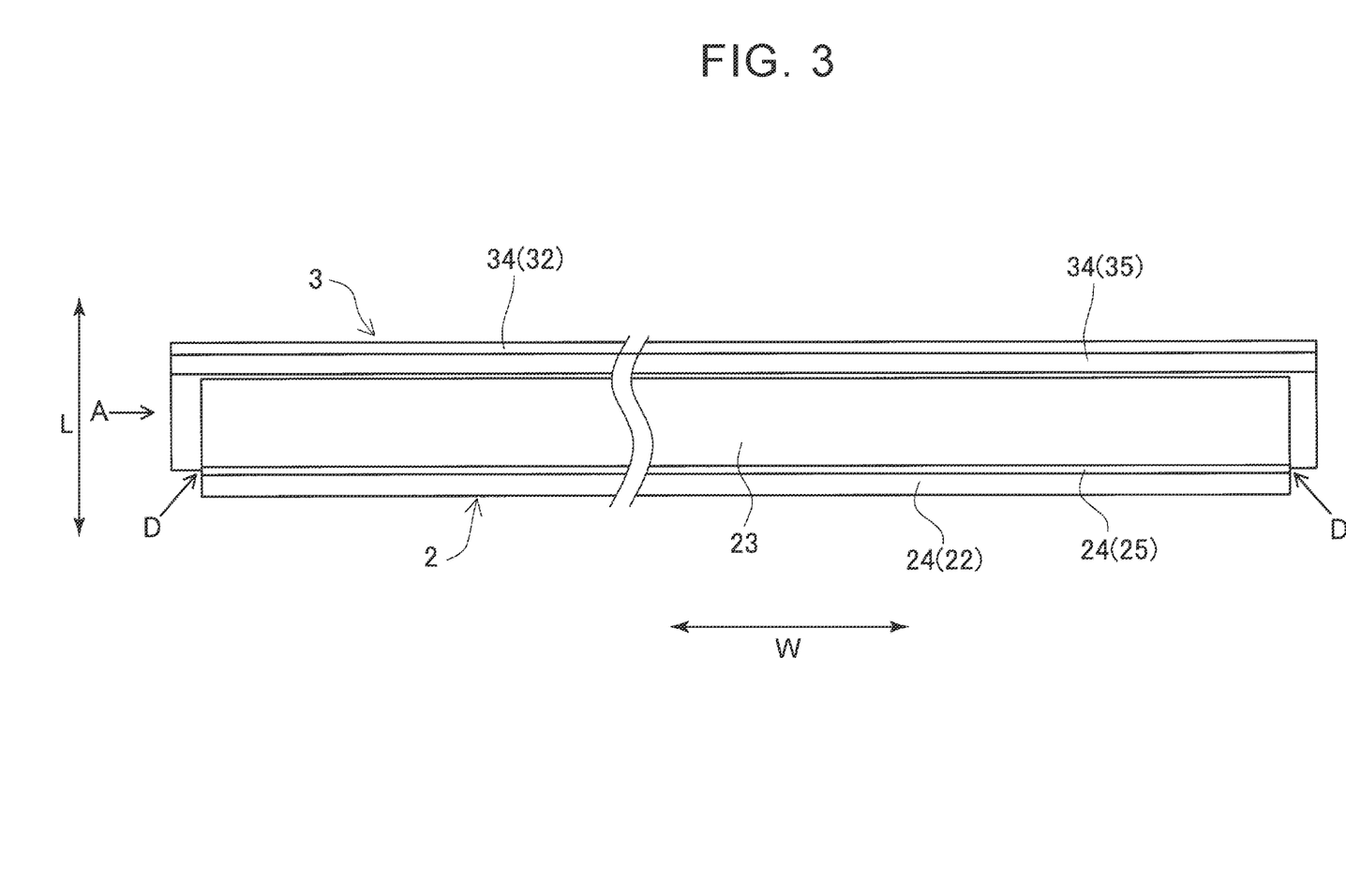
FIG. 3 is a plan view showing a state of a positive electrode plate and a negative electrode plate that constitute the electrode winding body according to the embodiment before the positive electrode plate and the negative electrode plate are wound.
Figure 4:
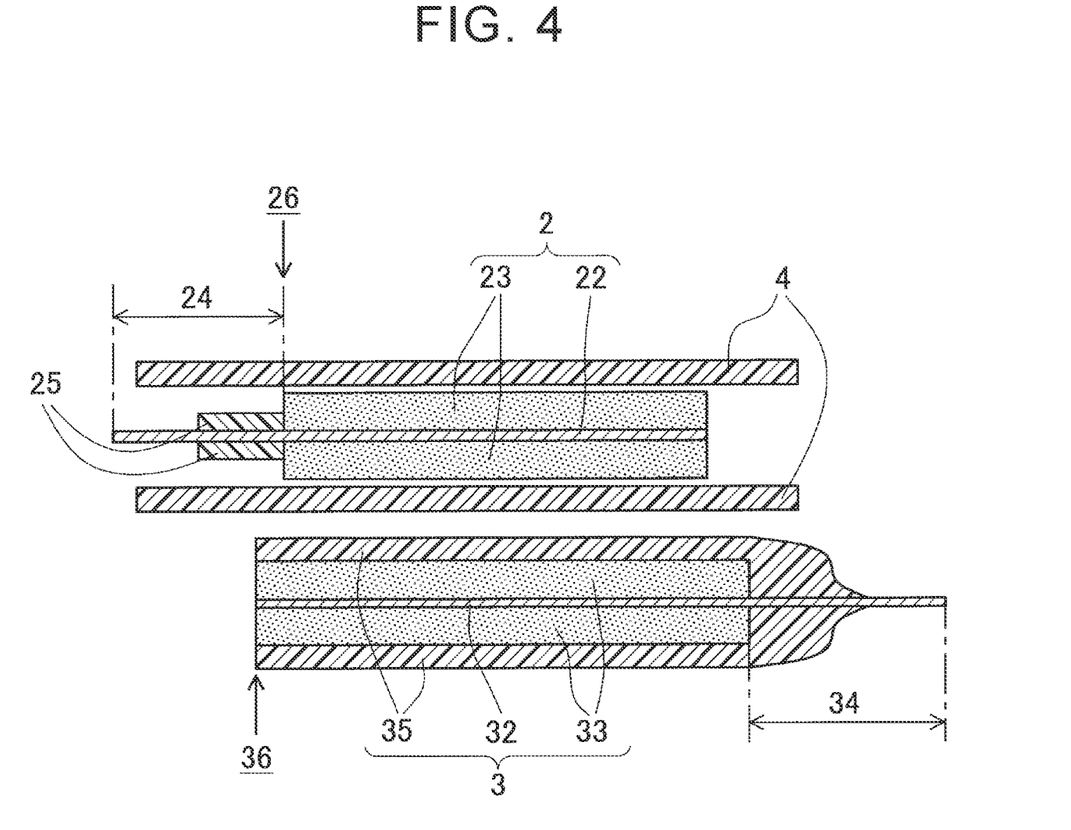
FIG. 4 is a side view showing the positive electrode plate and the negative electrode plate shown in FIG. 3 together with an insulating tape.

FIG. 3 shows a state of the positive electrode plate 2 and the negative electrode plate 3 that constitute the electrode winding body 20 before the positive electrode plate 2 and the negative electrode plate 3 are wound. Each of the positive electrode plate 2 and the negative electrode plate 3 has a belt shape whose length in a longitudinal direction W is longer than that in a width direction L. FIG. 3 shows a state in which one positive electrode plate 2 is stacked on one negative electrode plate 3. FIG. 4 shows the positive electrode plate 2 and the negative electrode plate 3 shown in FIG. 3 as viewed from an arrow A in FIG. 3. The "insulating tape 4" in FIG. 4 does not appear in FIG. 3. Details on this will be described later.

As shown in FIG. 4, the positive electrode plate 2 has a current collecting foil 22 and a positive electrode active material layer 23 disposed on the surface of the current collecting foil 22. The positive electrode plate 2 has a protruding portion 24. The protruding portion 24 is a portion where the current collecting foil 22 is not covered with the positive electrode active material layer 23. The protruding portion 24 is located at one end of the positive electrode plate 2 in the width direction (a horizontal direction in FIG. 4). As shown in FIG. 3, the protruding portion 24 is provided over the entire length of the positive electrode plate 2 in the longitudinal direction W (a direction perpendicular to the surface of the paper in FIG. 4). The positive electrode plate 2 further has an insulating layer 25. The insulating layer 25 covers a portion of the current collecting foil 22 protruding outward from the positive electrode active material layer 23, that is, the protruding portion 24. The insulating layer 25 is provided at a position adjacent to the positive electrode active material layer 23. The insulating layer 25 is a layer composed of ceramic particles and a binder. The insulating layer 25 is formed by applying these materials to corresponding portions of the current collecting foil 22. The insulating layer 25 is thinner than the positive electrode active material layer 23.

The negative electrode plate 3 has a current collecting foil 32 and a negative electrode active material layer 33 disposed on the surface of the current collecting foil 32. The negative electrode plate 3 has a protruding portion 34. The protruding portion 34 is a portion where the current collecting foil 32 is not covered with the negative electrode active material layer 33. The protruding portion 34 is located at one end of the negative electrode plate 3 in the width direction. The protruding portion 34 is disposed on the opposite side of a portion where the positive electrode active material layer 23 and the negative electrode active material layer 33 overlap each other from the protruding portion 24 of the positive electrode plate 2. The protruding portion 34 is provided over the entire length of the negative electrode plate 3 in the longitudinal direction W as shown in FIG. 3. The negative electrode plate 3 further has a separator layer 35. The separator layer 35 is of a coating type. In other words, the separator layer 35 is not an independent film but is integrated with the negative electrode plate 3. The separator layer 35 covers the entire negative electrode active material layer 33 and a part of the protruding portion 34, and exposes a remaining portion of the protruding portion 34. The separator layer 35 is a layer formed by applying a porous resin on the negative electrode active material layer 33 and the protruding portion 34.

Figure 1:
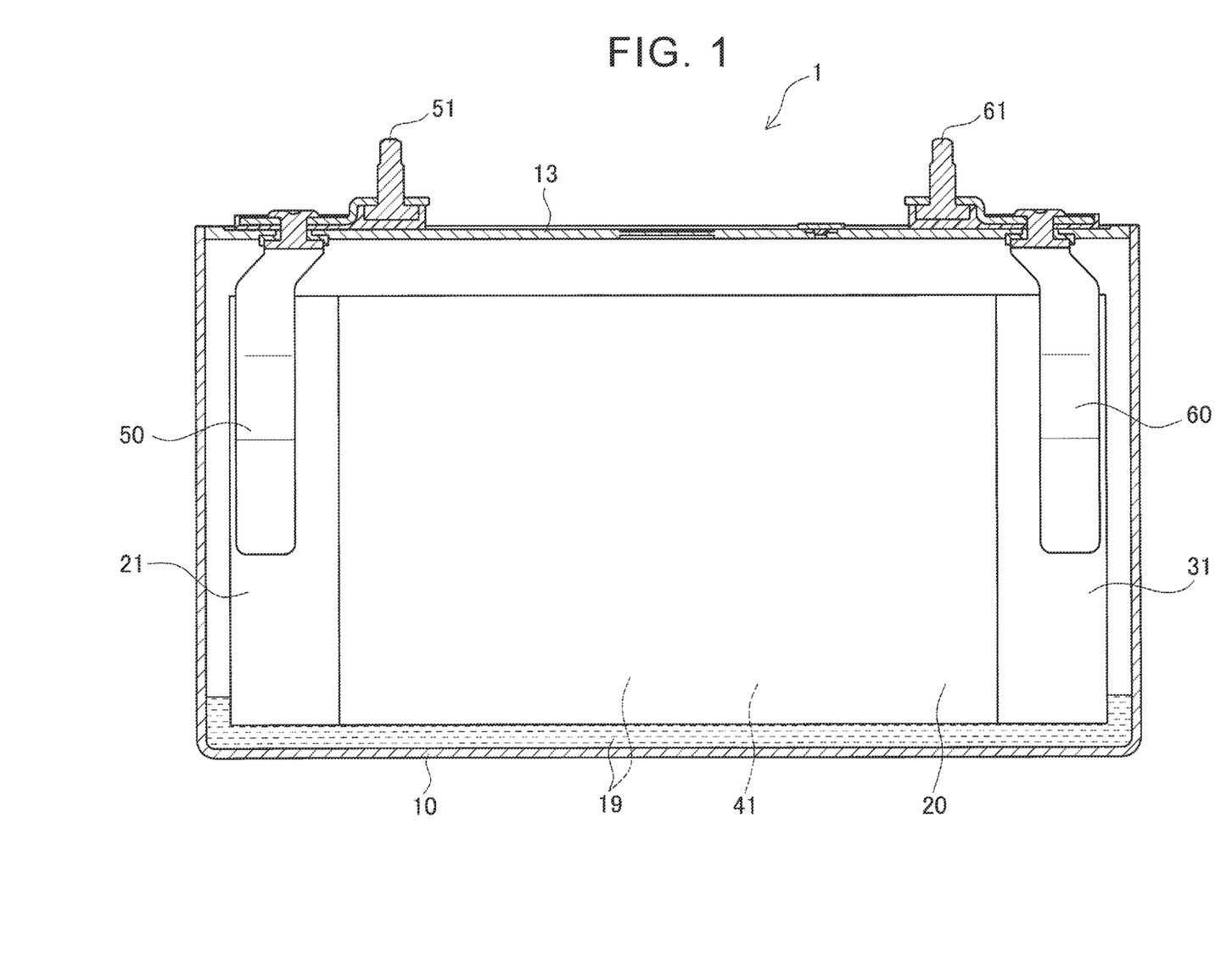
FIG. 1 is a sectional view showing a configuration of an inside of a battery according to an embodiment.
Figure 5:
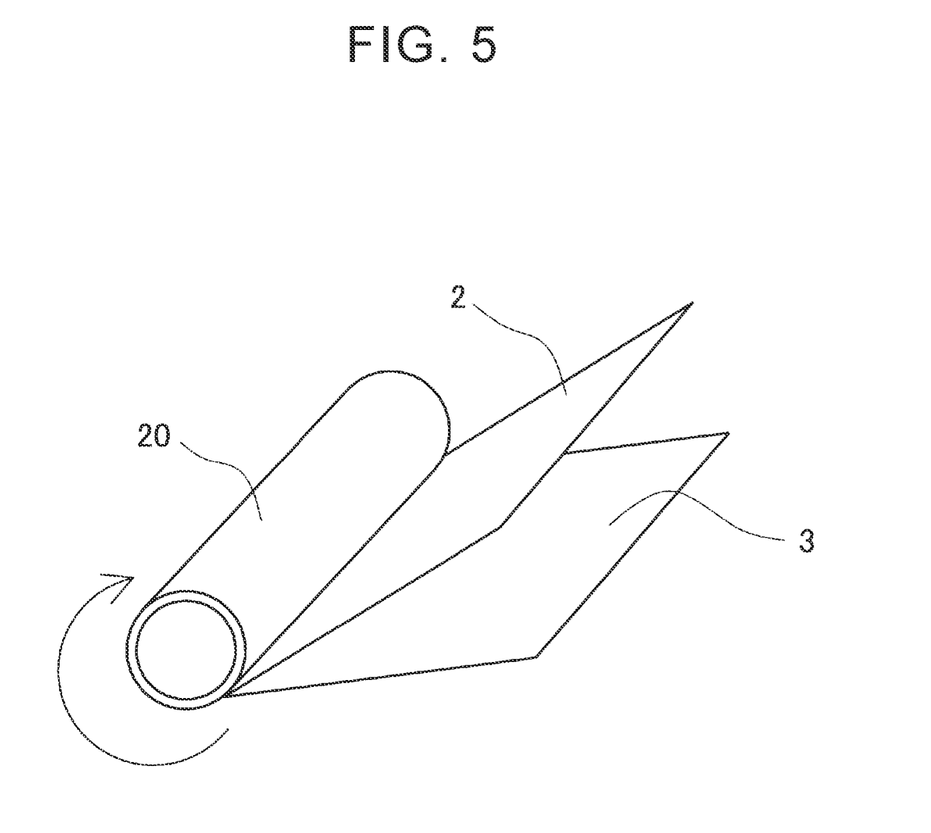
FIG. 5 is a schematic diagram showing a state in which the positive electrode plate and a negative electrode plate are being wound.

In FIGS. 3 and 4, the range in which the positive electrode plate 2 (the positive electrode active material layer 23) and the negative electrode plate 3 (the negative electrode active material layer 33) overlap each other when viewed from above corresponds to the power generating portion 41 in FIGS. 1 and 2. The range including only the protruding portion 24 of the positive electrode plate 2 corresponds to the positive electrode connecting portion 21, and the range including only the protruding portion 34 of the negative electrode plate 3 corresponds to the negative electrode connecting portion 31. The electrode winding body 20 is obtained by winding, as shown in FIG. 5, the positive electrode plate 2 and the negative electrode plate 3 shown in FIGS. 3 and 4 into a flat shape. At the time of winding, the winding starts at one end of the positive electrode plate 2 and the negative electrode plate 3 in the left-right direction in FIG. 3 and the winding ends at the other end thereof in the left-right direction in FIG. 3. At the time of winding, the positive electrode plate 2 is generally placed inside the negative electrode plate 3. However, due to the winding, the positive electrode plate 2 is also located outside the negative electrode plate 3 except for the outermost periphery.

Figure 6:
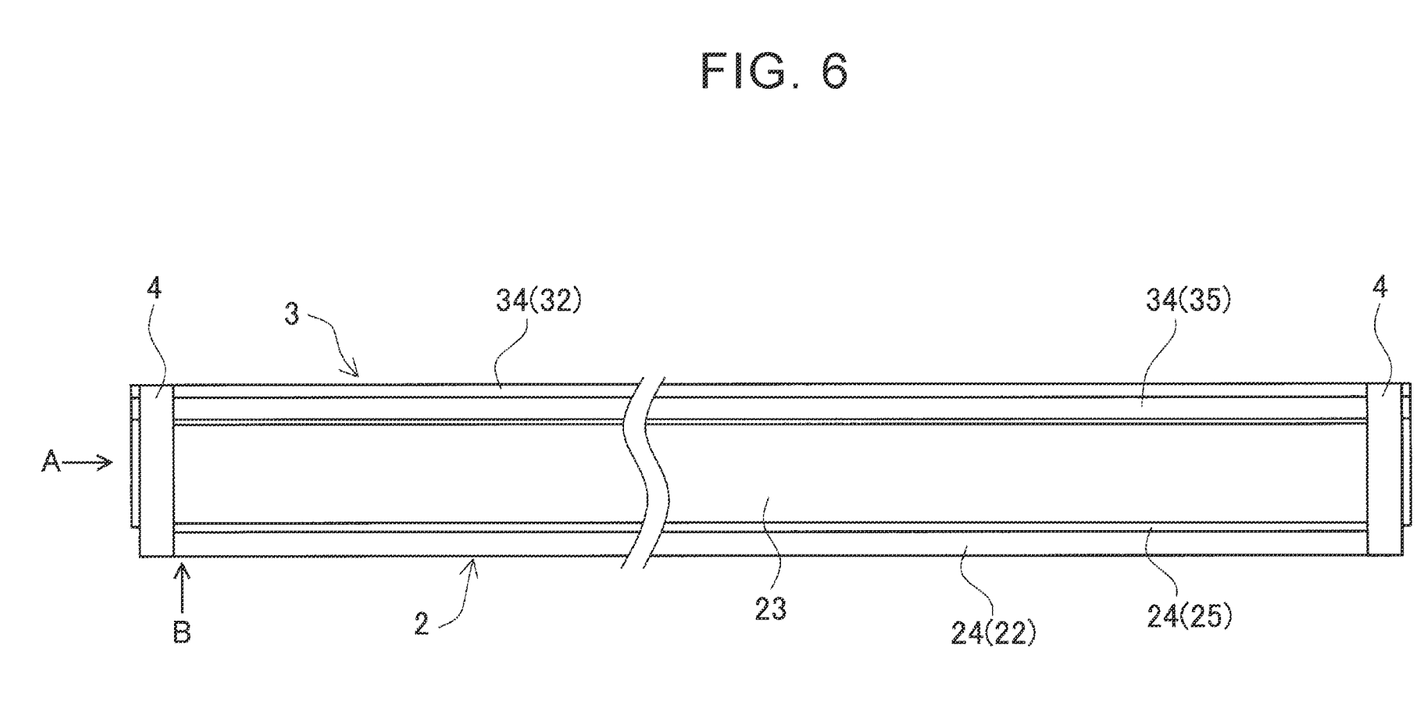
FIG. 6 is a plan view showing a state of the positive electrode plate, the negative electrode plate, and the insulating tape that constitute the electrode winding body according to the embodiment before the positive electrode plate, the negative electrode plate, and the insulating tape are wound.

In addition to the positive electrode plate 2 and the negative electrode plate 3, the insulating tape 4 shown in FIG. 4 is also wound in the electrode winding body 20. The insulating tape 4 is a resin tape whose one surface is an adhesive surface. The insulating tape 4 is preferably made of a material that does not cause a side reaction inside the battery 1. A material using a polyolefin resin as a base resin satisfies this requirement for most battery types. Specific examples include polyethylene and polypropylene. As shown in FIG. 4, the insulating tape 4 is disposed on the front side and the back side of the positive electrode plate 2. Each of the insulating tapes 4 has its adhesive surface facing the positive electrode plate 2. FIG. 6 is different from FIG. 3 in that the insulating tape 4 is added in FIG. 6. As shown in FIG. 6, the insulating tape 4 is disposed at both ends of the positive electrode plate 2 and the negative electrode plate 3 in the longitudinal direction. That is, the insulating tape 4 is attached to a winding start position and a winding end position in the electrode winding body 20.

The position of the insulating tape 4 will be further described. Of the positive electrode plate 2 and the negative electrode plate 3 to be wound, the negative electrode plate 3 is longer than the positive electrode plate 2 the as shown in FIG. 3. Both ends of the negative electrode plate 3 in the longitudinal direction protrude outward in the longitudinal direction from both ends of the positive electrode plate 2 in the longitudinal direction. The insulating tape 4 is provided in a region including the both ends of the positive electrode plate 2 in the longitudinal direction. That is, a part of the insulating tape 4 protrudes outward from the ends of the positive electrode plate 2 in the longitudinal direction. Thus, the ends of the positive electrode plate 2 in the longitudinal direction themselves are hidden by the insulating tape 4 and cannot be seen in FIG. 6. In the electrode winding body 20, the insulating tape 4 is interposed between the positive electrode plate 2 and the negative electrode plate 3.

Figure 7:
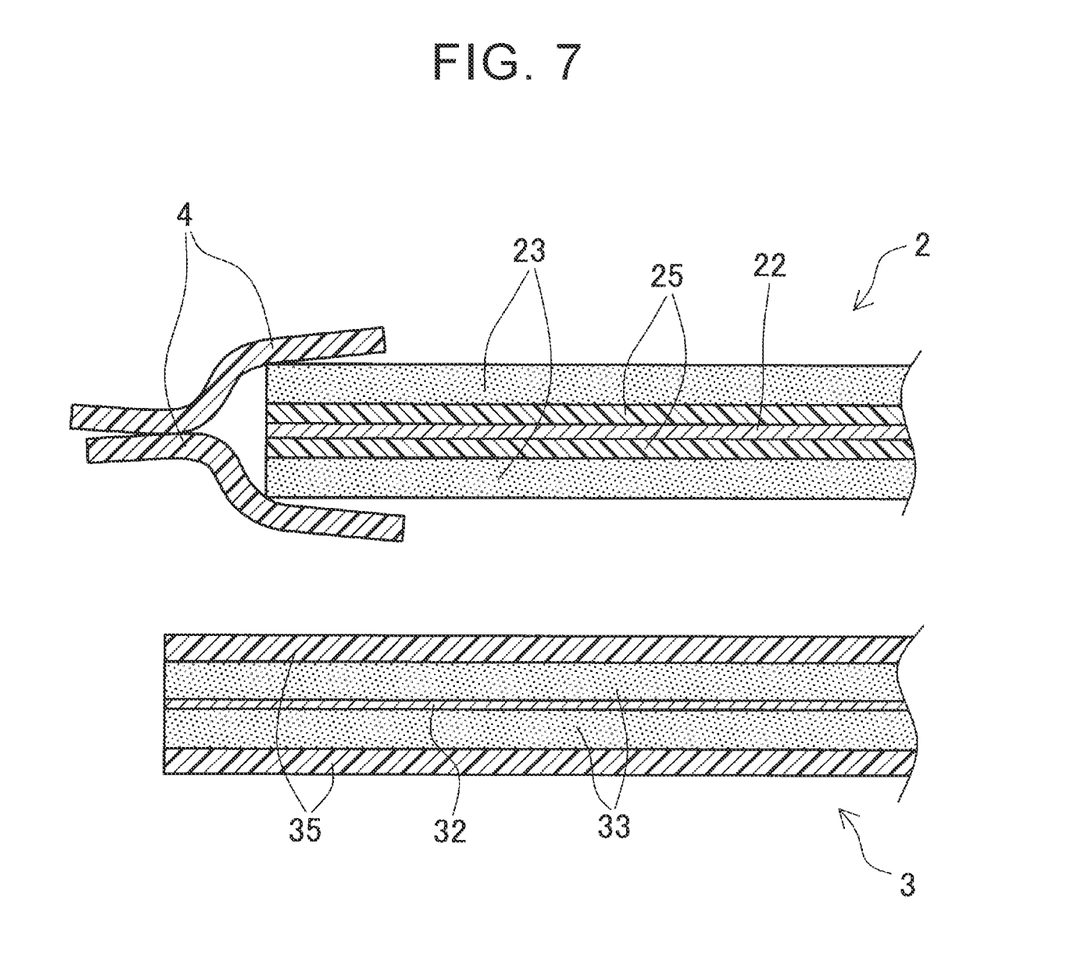
FIG. 7 is a partial front view showing the positive electrode plate, the negative electrode plate, and the insulating tape shown in FIG. 6.

FIG. 7 shows the positive electrode plate 2, the negative electrode plate 3, and the insulating tape 4 as viewed from an arrow B shown in FIG. 6. A part of the insulating tape 4 is applied to a surface of the positive electrode plate 2, and another part of the insulating tape 4 protrudes outward from the positive electrode plate 2 in the longitudinal direction. In the range of the insulating tape 4 protruding outward from the positive electrode plate 2, the adhesive surfaces of the insulating tapes 4 on the front and back sides are adhered to each other. Alternatively, one insulating tape 4 may be applied so as to cover the end of the positive electrode plate 2 in the longitudinal direction by folding the insulating tape 4 such that its adhesive surface faces inward. Even in such a case, since the folded portion of the insulating tape 4 protrudes outward from the end of the positive electrode plate 2 in the longitudinal direction, the end of the positive electrode plate 2 in the longitudinal direction is included in the region where the insulating tape 4 is provided. As described above, the insulating tape 4 is wound inside the negative electrode plate 3 by winding. Therefore, the insulating tape 4 does not appear in FIGS. 1 and 2.

Of the two insulating tapes 4 in FIG. 6, the one on the side where the winding is started at the time of winding shown in FIG. 5 preferably has a certain size in the longitudinal direction. This is for improving gripping properties using a winding tool particularly at the start of winding. When the coating-type separator layer 35 is used without using a film separator, friction at the time of winding tends to be smaller as compared to the case in which a film separator is used. By setting the size of the insulating tape 4 in the longitudinal direction on the side where the winding is started to, for example, 5 mm or more, the gripping properties at the start of winding can be improved.

Figure 8:
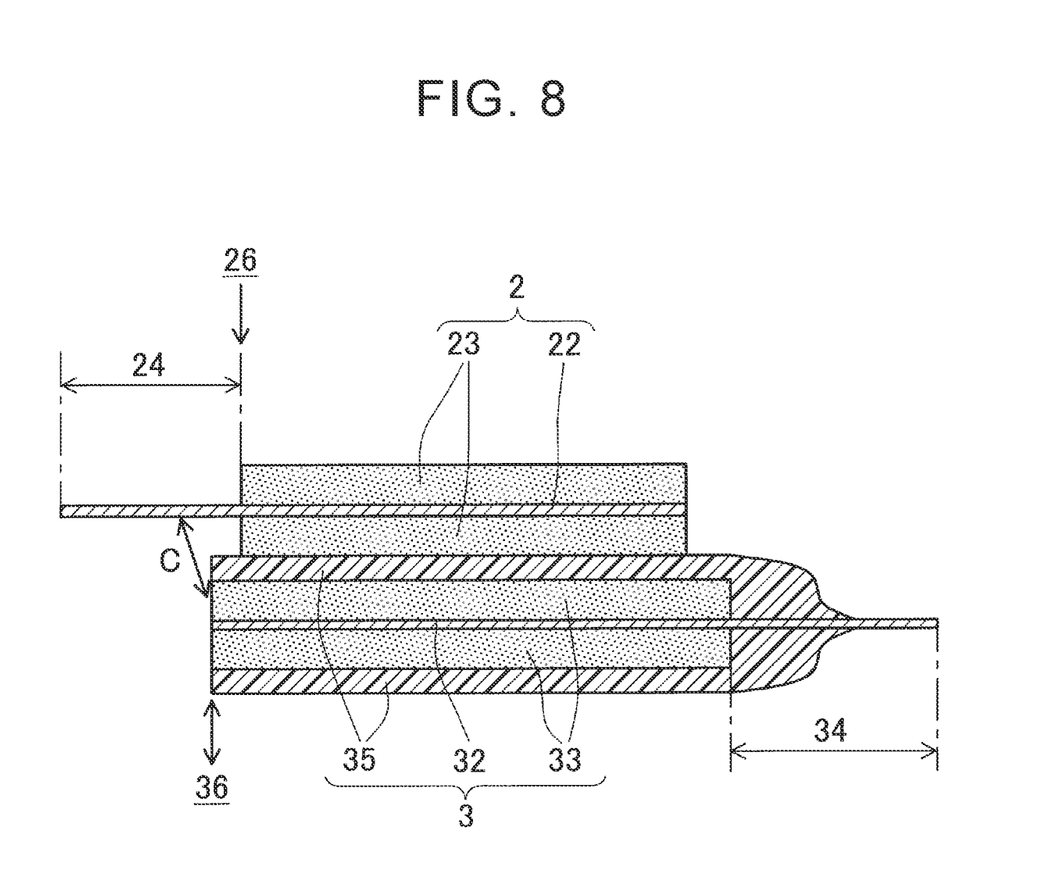
FIG. 8 is a side view showing the electrode winding body excluding an insulating layer and the insulating tape as compared to FIG. 4.

In the electrode winding body 20 according to the embodiment, the separator layer 35 restrains direct contact between the positive electrode active material layer 23 and the negative electrode active material layer 33. Further, the insulating layer 25 and the insulating tape 4 restrain a short circuit between the positive electrode plate 2 and the negative electrode plate 3. The restraint of the short circuit by the insulating layer 25 and the insulating tape 4 will be described. FIG. 8 shows the electrode winding body 20 excluding the insulating layer 25 and the insulating tape 4 as compared to FIG. 4.

First, the restraint of the short circuit using the insulating layer 25 will be described. In the case where the coating-type separator layer 35 is used as in the embodiment, in a situation where the positive electrode plate 2 and the negative electrode plate 3 overlap each other, the protruding portion 24 (current collecting foil 22) of the positive electrode plate 2 and the negative electrode active material layer 33 of the negative electrode plate 3 are located in close vicinity to each other (indicated by an arrow C in FIG. 8). The distance between the protruding portion 24 of the positive electrode plate 2 and the negative electrode active material layer 33 of the negative electrode plate 3 is only about the total thickness of the separator layer 35 and the positive electrode active material layer 23. There are no shields therebetween. This is because it is extremely difficult to form the coating-type separator layer 35 in a size larger than that of the negative electrode plate 3. Thus, the short circuit may be considered to occur between the positive electrode plate 2 and the negative electrode plate 3 depending on factors such as load applied to the electrode winding body 20. The arrow C in FIG. 8 extends over the entire length of the positive electrode plate 2 and the negative electrode plate 3 in the longitudinal direction.

In the actual electrode winding body 20 according to the embodiment, as shown in FIG. 4, the insulating layer 25 is provided in the positive electrode plate 2. This insulating layer 25 functions as a shield at the location of the arrow C in FIG. 8. Thereby, the short circuit is restrained. In FIG. 4, it appears that in addition to the insulating layer 25, the insulating tape 4 is also provided in the vicinity between the current collecting foil 22 and the negative electrode active material layer 33. However, as described with reference to FIG. 6, the insulating tape 4 is provided only at the both ends in the longitudinal direction. The insulating tape 4 is not provided in most regions except the both ends in the longitudinal direction, and the short circuit in the region shown by the arrow C is restrained only by the insulating layer 25. In order for the insulating layer 25 to exhibit its function of restraining the short circuit, the left end of the negative electrode plate 3 (the current collecting foil 32, the negative electrode active material layer 33, and the separator layer 35) in FIG. 4 is disposed within the range of the insulating layer 25 in the width direction (right-left direction in FIG. 4).

Next, the restraint of the short circuit using the insulating tape 4 will be described. In the electrode winding body 20, there are two portions where the restraint of the short circuit using the insulating layer 25 described above is insufficient, which are the two ends of the positive electrode plate 2 in the longitudinal direction, that is, the winding start position and the winding end position. The two locations are indicated by arrows D in FIG. 3. At these locations, the short circuit that may occur along the path indicated by the arrow C in FIG. 8 cannot be sufficiently restrained by the insulating layer 25 alone. This is because the insulating layer 25 is of a coating type and is not formed so as to protrude outward from the positive electrode plate 2. Therefore, the insulating tape 4 shown in FIGS. 4 and 6 is provided as an insulating member for shielding these portions. The insulating tape 4 restrains short circuits at these two locations.

The range to which the insulating tape 4 is applied is as described above in the longitudinal direction. As to the range of the insulating tape 4 in the width direction, FIG. 6 shows a state in which the insulating tape 4 is applied to almost the entire length of the positive electrode plate 2 in the width direction, but the range of the insulating tape 4 in the width direction is not limited thereto. The range to which the insulating tape 4 is applied in the width direction will be described. For convenience of description, the left end of the negative electrode plate 3 (the current collecting foil 32, the negative electrode active material layer 33, and the separator layer 35) in the width direction in FIG. 4 is hereinafter referred to as a first end 36. Of the two ends of the negative electrode plate 3 in the width direction, the first end 36 is located on a side on which the protruding portion 24 of the positive electrode plate 2 is provided. The end of the positive electrode active material layer 23 of the positive electrode plate 2 in the width direction located adjacent to the protruding portion 24 is hereinafter referred to as a second end 26. The first end 36 protrudes further outward in the width direction with respect to the second end 26. The outward direction in the width direction refers to an outward direction with respect to a position where the positive electrode active material layer 23 and the negative electrode active material layer 33 are located, that is, with the power generating portion 41 serving as the center.

Figure 9:
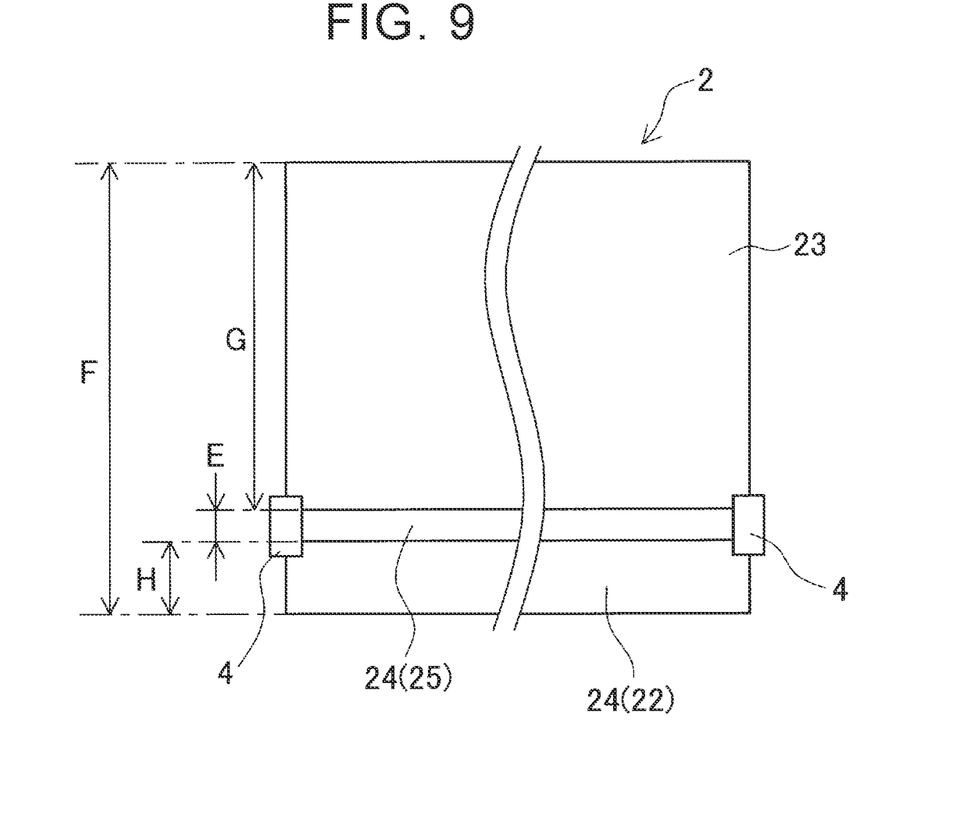
FIG. 9 is a plan view showing a required range of the insulating tape in a width direction.

The insulating tape 4 is applied to a region including at least the first end 36 and the second end 26 in the width direction to make the restraint of the short circuit effective. Specifically, as shown in FIG. 9, the insulating tape 4 is applied so as to cover the range where the insulating layer 25 is provided in the width direction (indicated by an arrow E). As a result, the first end 36 and the second end 26 are included in the range of the insulating tape 4 in the width direction. The insulating tape 4 is preferably applied over the entire width (indicate by an arrow F) of the positive electrode plate 2 so that unevenness in thickness of the electrode winding body 20 in the width direction can be restrained from occurring.

As described above, the electrode winding body 20 according to the embodiment is of the flat shape shown in FIG. 2. In the flat electrode winding body 20, the insulating tape 4 is preferably disposed on the turning portions 71 and 72 rather than on the flat portion 70. In particular, the insulating tape 4 is preferably disposed in the upper turning portion 71 in the battery 1 shown in FIG. 1. The upper turning portion 71 is located closer to the positive electrode terminal 51 and the negative electrode terminal 61 in the battery 1. The battery 1 is normally used in a state in which a portion where the positive electrode terminal 51 and the negative electrode terminal 61 is an upper portion of the battery 1 in the up-down direction.

Figure 10:
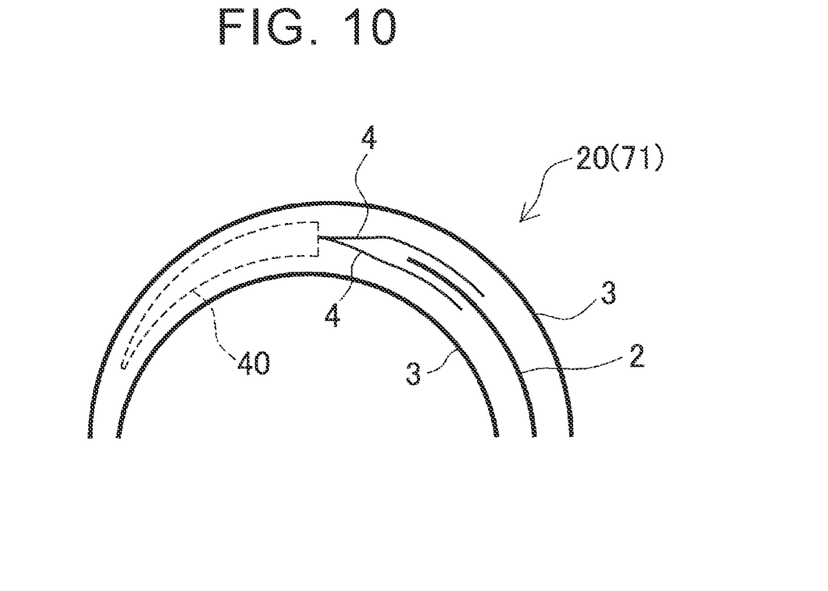
FIG. 10 is a schematic partial sectional view showing a state inside the electrode winding body.

The insulating tape 4 is preferably disposed on the turning portion 71 due to the liquid retainability of the electrode winding body 20. As shown in FIG. 10, in the electrode winding body 20, a gap 40 is formed adjacent to the insulating tape 4 and between the two negative electrode plates 3. This is because the insulating tape 4 is disposed at the ends of the positive electrode plate 2 in the longitudinal direction. The electrolyte solution 19 described above can be stored in the gap 40. When the insulating tape 4 is disposed on the upper turning portion 71, the gap 40 is also located near the uppermost point of the electrode winding body 20. When the electrolyte solution 19 is stored in the gap 40 at this position, the shortage of the electrolyte solution 19 in the upper portion of the electrode winding body 20 (including the turning portion 71) is reduced. The above effect is effective because the electrolyte solution 19 tends to be insufficient in the upper portion of the electrode winding body 20.

In the battery 1 according to the embodiment configured as described above, the electrode winding body 20 immersed in the electrolyte solution 19 in the battery case 10 functions as a power generation element. In this electrode winding body 20, the short circuit between the positive electrode plate 2 and the negative electrode plate 3 is restrained by the insulating tape 4. This realizes the battery 1 using the coating-type separator layer 35 and suppression of the short circuit between the electrode plates. In addition to the insulating tape 4, the insulating layer 25 also contributes to restraining the short circuit. The insulating tape 4 does not restrain the power generation function which is the original function of the electrode winding body 20. This is because, as shown in FIG. 6, the insulating tape 4 is disposed only at the both ends of the positive electrode plate 2 in the longitudinal direction, and is not provided in a region therebetween.

Examples of the embodiment will be described below. The Examples represent a case where the disclosure is applied to a lithium ion secondary battery. The purpose of the Examples is to confirm the advantages of the insulating tape 4 by changing, to some extent, the relationship between the size of the positive electrode plate 2 and the size of the insulating tape 4 in the width direction.

Configuration of Negative Electrode Plate 3
   Current collecting foil 32: Copper foil
   Negative electrode active material layer 33: Natural graphite particles, binder (carboxymethyl cellulose, styrene butadiene rubber)
   Separator layer 35: Porous coating layer based on polyvinyl alcohol
Configuration of Positive Electrode Plate 2
   Current collecting foil 22: Aluminum foil
   Positive electrode active material layer 23: Lithium ternary composite oxide, binder (polyvinylidene fluoride)
   Coating width of positive electrode active material layer 23 (G in FIG. 9): 120 mm
   Insulating layer 25: Mixture of insulating particles (boehmite (AlOOH)) and binder (polyvinylidene fluoride) (weight ratio 4:1)
   Coating width of insulating layer 25 (E in FIG. 9): 5 mm
   Uncoated width (H in FIG. 9): 15 mm
Components of Electrolyte Solution 19
   Solvent: Mixed solution of ethylene carbonate, dimethyl carbonate, and ethyl methyl carbonate (volume ratio 1:1:1)
   Electrolyte: Lithium hexafluorophosphate (concentration 1 mol/l)
Insulating Tape 4
   Base material: Polyethylene (thickness 0.1 mm, width (size in longitudinal direction in FIG. 6) 10 mm)
   Adhesive: Acrylic Under the above conditions, 10 samples for each of Comparative Example and Examples 1 to 3 shown in Table 1 were produced. Note that the insulating tape 4 was not used in the Comparative Example. In each sample, the insulating tape 4 on the winding end side of the electrode winding body 20 (the end of the positive electrode plate 2 in the longitudinal direction on the winding end side in the Comparative Example) was disposed on the upper turning portion 71. For each of these samples, high-temperature aging and initial activation were performed, and the occurrence of short circuit failure and the state of liquid retention in the turning portion 71 were inspected at a later time.

TABLE 1

|  | J (mm) | K (mm) | Short circuit failure | Liquid retention amount |
|---|---|---|---|---|
| Example 1 | 1 | 1 | 0 | 1.03 |
| Example 2 | 50 | 5 |  | 1.07 |
| Example 3 | 120 | 5 |  | 1.11 |
| Comparative Example | No insulating tape |  | 10 | 1.00 |

Figure 11:
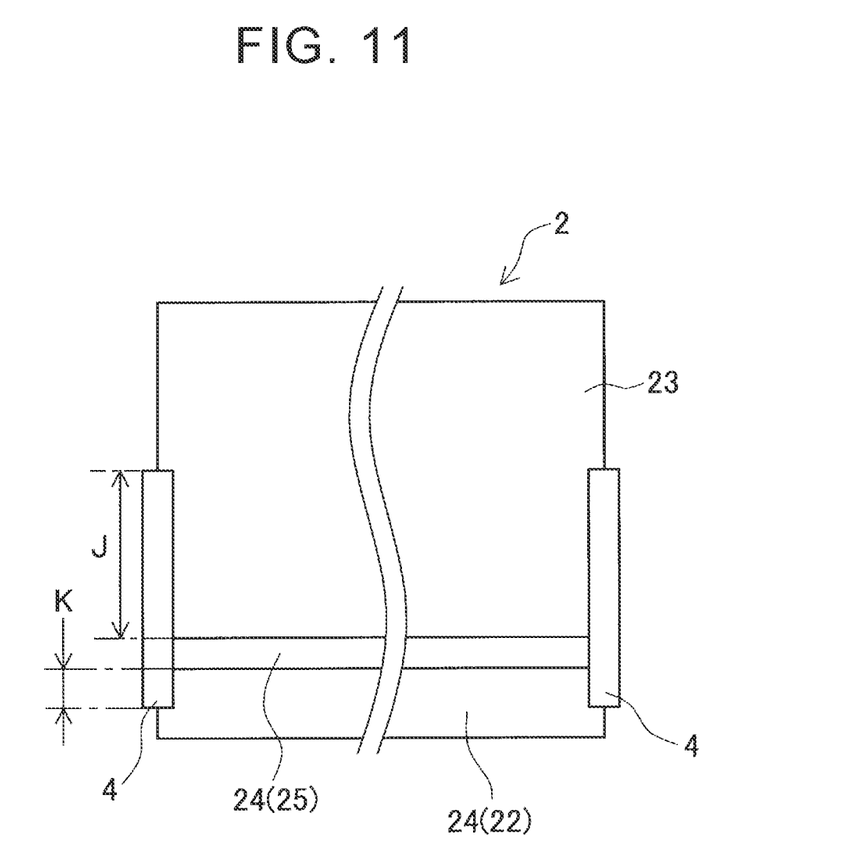
FIG. 11 is a plan view showing a size of the insulating tape in the width direction according to Examples.

Columns of "J" and "K" in Table 1 represents the size of the range of the insulating tape 4 indicated by "J" and "K" in FIG. 11 (both in the width direction). Columns of "short circuit failure" and "liquid retention amount" in Table 1 show the inspection results. "Short circuit failure" indicates the number of samples in which a short circuit has occurred. "Liquid retention amount" indicates the liquid retention state in the turning portion 71. Specifically, the separator layer 35 was cut out from the turning portion 71 and used as a sample. More specifically, a part of the separator layer 35 adjacent to the outside of the end of the positive electrode plate 2 in the longitudinal direction (winding end side) at the relevant portion was cut out. The content of phosphorus (P) in the sample was measured by inductively coupled plasma (ICP) atomic emission spectroscopy. Table 1 shows the average value of the 10 samples standardized based on the resultant values of the Comparative Example. It can be considered that the larger this value is, the more the electrolyte solution 19 is retained in the turning portion 71 of the electrode winding body 20. This is because phosphorus contained in the sample is considered to be derived from the electrolyte of the electrolyte solution 19.

Referring to the column of "short circuit failure" in Table 1, the value is "0" in all of Examples 1 to 3. This indicates that, in Examples 1 to 3, no short circuit failure occurred in any of the 10 samples. In contrast, in the Comparative Example, the value is "10", which indicates that short circuit failure has occurred in all of the 10 samples. The results obviously indicate that use of the insulating tape 4 has the effect of restraining the short circuit. In particular, as in Example 1, it can be understood that only applying the minimum amount of the insulating tape 4 extending to substantially the same size as that of the insulating layer 25 in the width direction is effective enough.

Referring to the "liquid retention amount" column in Table 1, a value larger than 1 is shown in all of Examples 1 to 3. The value of Example 2 is larger than that of Example 1, and the value of Example 3 is larger than that of Example 2. The results can be understood as follows. The insulating tape 4 in all of Examples 1 to 3 causes the gap 40 shown in FIG. 10 to be larger than that of the Comparative Example in which the insulating tape 4 is not provided. Therefore, the amount of the electrolyte solution 19 stored in the gap 40 is large in Examples 1 to 3. In addition, as the width of the insulating tape 4 is set larger in the order of Example 1 to Example 3, the volume of the gap 40 is larger, and more electrolyte 19 is stored. Thus, it can be understood that the insulating tape 4 contributes to the improvement of the liquid retainability at the turning portion 71. It can also be understood that as the width of the insulating tape 4 is set larger, the degree of improvement is greater.

The embodiment and Examples described above are merely examples and do not limit the disclosure. Therefore, it goes without saying that various improvements and modifications can be made in the disclosure without departing from the scope of the disclosure. For example, the power storage element to which the disclosure is applied is not limited to the lithium ion secondary battery described in the Examples. The disclosure can be applied to any type of power storage element as long as the power storage element uses an electrode winding body having a structure in which positive and negative electrode plates are wound. The positions of the positive and negative electrode plates may be reversed. In the embodiment and Examples described above, the outer shape of the battery 1 and the shape of the electrode winding body 20 are flat, but the disclosure can be applied to a battery and an electrode winding body each having a cylindrical shape. However, when the battery and the electrode winding body each has a cylindrical shape, there is no distinction in locations such as the flat portion 70 and the turning portions 71 and 72 in the electrode winding body 20, so there is no particular circumferential position where the insulating tape 4 is preferably provided.

The insulating layer 25 of the positive electrode plate 2 is not essential. Therefore, a mode in which the insulating layer 25 is excluded from the above embodiment is also applicable. Although the insulating layer 25 has a shielding effect against the short circuit indicated by the arrow C in FIG. 8 as described above, it does not mean that the short circuit always occurs without the insulating layer 25. Considering the case where neither the insulating layer 25 nor the insulating tape 4 is provided, a short circuit indicated by the arrow D in FIG. 3 may occur at the ends of the positive electrode plate 2 in the longitudinal direction. Therefore, it is effective to use the insulating tape 4 to restrain the short circuit indicated by the arrow D in FIG. 3 when the insulating layer 25 is not provided.

The insulating tape 4 need not have an adhesive surface. This is because the adhesiveness of the insulating tape 4 is effective in facilitating the winding operation, but is not particularly effective after winding. The base material of the insulating tape 4 only needs to have insulation properties and chemical stability in the battery 1. The base material may be a porous resin or paper.

What is claimed is:

1. A power storage element comprising:
an electrode winding body provided by winding a first electrode plate and a second electrode plate, each of the first electrode plate and the second electrode plate having a belt shape having a size in a longitudinal direction longer than a size in a width direction,
the first electrode plate including
a first current collecting foil,
a first electrode active material layer disposed on a surface of the first current collecting foil, and
a separator layer that covers the first electrode active material layer, the separator layer being integrated with the first electrode active material layer, and
the first current collecting foil having a first protruding portion in which the first current collecting foil is not covered with the first electrode active material being provided at one end in the width direction over an entire length in the longitudinal direction;
the second electrode plate including
a second current collecting foil, and
a second electrode active material layer disposed on a surface of the second current collecting foil, a second protruding portion in which the second current collecting foil is not covered with the second electrode active material layer being provided at one end in the width direction over an entire length in the longitudinal direction, wherein:
in the electrode winding body, a first end located on a side on which the second protruding portion is provided is located outward of a second end in the width direction, the first end being an end of a laminated body of the first current collecting foil, the first electrode active material layer, and the separator layer in the width direction of the laminated body, and the second end being located adjacent to the second protruding portion and being a width direction end of the second electrode active material layer;
in the electrode winding body, an insulating member is interposed between the first electrode plate and the second electrode plate;
the insulating member is provided in a region including at least the second end and the first end in the width direction;
the insulating member is provided in a region including a third end of the second electrode plate in the longitudinal direction and a fourth end opposite to the third end in the longitudinal direction, and is not provided in a region between the third end and the fourth end in the longitudinal direction;
the second electrode plate has an insulating layer that covers a region of the second protruding portion, the region being adjacent to the second electrode active material layer;
the first end is located within a range where the insulating layer is provided; and
the insulating member is provided in a region including at least a region where the insulating layer is provided in the width direction;
the insulating member covers the entirety of the insulating layer;
the insulating member includes a first insulating tape and a second insulating tape being respectively disposed on a front side and a back side of the second electrode plate; and
in a range of the first insulating tape and the second insulating tape protruding outward from the second electrode plate, adhesive surfaces of the first insulating tape and the second insulating tape on the front and back sides are adhered to each other.

2. The power storage element according to claim 1, wherein the insulating member is provided over an entire length of the second electrode plate in the width direction.

3. The power storage element according to claim 1, wherein the electrode winding body is a flat winding body having a flat portion and two turning portions, and at least one of the insulating members is disposed on an upper turning portion of the two turning portions in a use state of the power storage element.

4. The power storage element according to claim 1, wherein:
the insulating member is a resin tape, one surface of the insulating member being an adhesive surface; and
the insulating member is provided on front and back surfaces of the second electrode plate at the third end and the fourth end, with the adhesive surface facing the second electrode plate and a part of the insulating member disposed so as to protrude outward from the second electrode plate in the longitudinal direction.

5. The power storage element according to claim 1, wherein the separator layer is a porous resin applied on the first electrode active material layer.

6. The power storage element according to claim 1, wherein the separator layer is a porous resin applied on the first electrode active material layer and the first protruding portion.

7. The power storage element according to claim 1, wherein the separator layer is adhered to the first electrode active material layer.

8. The power storage element according to claim 1, wherein the separator layer is adhered to the first electrode active material layer and the first protruding portion.

9. The power storage element according to claim 1, wherein the separator layer is a porous coating layer based on polyvinyl alcohol.

10. The power storage element according to claim 1, wherein the separator layer is a coating on the first electrode active material layer.

11. The power storage element according to claim 1, wherein the separator layer is a coating on the first electrode active material layer and the first protruding portion.

12. A power storage element comprising:
an electrode winding body provided by winding a first electrode plate and a second electrode plate, each of the first electrode plate and the second electrode plate having a belt shape having a size in a longitudinal direction longer than a size in a width direction,
the first electrode plate including
a first current collecting foil,
a first electrode active material layer disposed on a surface of the first current collecting foil, and
a separator layer that covers the first electrode active material layer, the separator layer being integrated with the first electrode active material layer, and
the first current collecting foil having a first protruding portion in which the first current collecting foil is not covered with the first electrode active material being provided at one end in the width direction over an entire length in the longitudinal direction;
the second electrode plate including
a second current collecting foil, and
a second electrode active material layer disposed on a surface of the second current collecting foil, a second protruding portion in which the second current collecting foil is not covered with the second electrode active material layer being provided at one end in the width direction over an entire length in the longitudinal direction, wherein:
in the electrode winding body, a first end located on a side on which the second protruding portion is provided is located outward of a second end in the width direction, the first end being an end of a laminated body of the first current collecting foil, the first electrode active material layer, and the separator layer in the width direction of the laminated body, and the second end being located adjacent to the second protruding portion and being a width direction end of the second electrode active material layer;
in the electrode winding body, an insulating member is interposed between the first electrode plate and the second electrode plate;
the insulating member is provided in a region including at least the second end and the first end in the width direction;
the insulating member is provided in a region including a third end of the second electrode plate in the longitudinal direction and a fourth end opposite to the third end in the longitudinal direction, and is not provided in a region between the third end and the fourth end in the longitudinal direction;
the second electrode plate has an insulating layer that covers a region of the second protruding portion, the region being adjacent to the second electrode active material layer;
the first end is located within a range where the insulating layer is provided; and
the insulating member is provided in a region including at least a region where the insulating layer is provided in the width direction;
the insulating member covers the entirety of the insulating layer; and
the insulating member is applied so as to cover an end of the second electrode plate in a longitudinal direction by folding the insulating member such that an adhesive surface of the insulating member faces inward.

\* \* \* \* \*